(12) United States Patent
Brock

(10) Patent No.: US 12,139,254 B2
(45) Date of Patent: Nov. 12, 2024

(54) MOONROOF ACCESSORY PANEL

(71) Applicant: Ford Global Technologies, LLC, Dearborn, MI (US)

(72) Inventor: Nelson Alexander Brock, San Francisco, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 510 days.

(21) Appl. No.: 17/544,535

(22) Filed: Dec. 7, 2021

(65) Prior Publication Data

US 2023/0174233 A1   Jun. 8, 2023

(51) Int. Cl.
| | |
|---|---|
| *B64C 39/02* | (2023.01) |
| *B60J 7/00* | (2006.01) |
| *B60P 3/11* | (2006.01) |
| *B64F 1/00* | (2006.01) |
| *B64U 70/00* | (2023.01) |
| *B64U 70/93* | (2023.01) |
| *B64U 80/86* | (2023.01) |

(52) U.S. Cl.
CPC .......... *B64C 39/024* (2013.01); *B60J 7/0007* (2013.01); *B60J 7/003* (2013.01); *B60P 3/11* (2013.01); *B64F 1/007* (2013.01); *B64U 70/00* (2023.01); *B64U 70/93* (2023.01); *B64U 80/86* (2023.01)

(58) Field of Classification Search
CPC ....... B64C 39/024; B60J 7/0007; B60J 7/003; B64U 70/00; B64U 80/86; B64U 70/93; B60P 3/11; B64F 1/007
USPC ........................................................ 296/215
See application file for complete search history.

(56) References Cited

U.S. PATENT DOCUMENTS

| | | | |
|---|---|---|---|
| 7,097,225 B2 | 8/2006 | Huisingh et al. | |
| 10,286,764 B2 * | 5/2019 | Kim | ......................... B60J 7/11 |
| 2020/0216196 A1 * | 7/2020 | Sohmshetty | ........... B64U 10/60 |
| 2021/0094687 A1 | 4/2021 | Brock et al. | |
| 2021/0122497 A1 | 4/2021 | Robertson, Jr. et al. | |

FOREIGN PATENT DOCUMENTS

| | | |
|---|---|---|
| WO | 2019053280 A1 | 3/2019 |
| WO | WO-2020037661 A1 * | 2/2020 |

OTHER PUBLICATIONS https://www.sciencedirect.com/topics/engineering/rigid-foam#:~:text=Rigid%20foams%20are%20derived%20from,processing%20is%20less%20energy%20intensive (Year: 2024).*

(Continued)

*Primary Examiner* — Joseph D. Pape
*Assistant Examiner* — Dana D Ivey
(74) *Attorney, Agent, or Firm* — Emily Drake; Eversheds Sutherland (US) LLP

(57) ABSTRACT

This disclosure describes a moonroof accessory panel. The moonroof accessory panel may be a structure that may be removably attached to a moonroof area of a vehicle. The moonroof accessory panel may be used to hold a drone associated with the vehicle such that the drone may take-off from and land on the moonroof accessory panel. The top of the moonroof accessory panel may also be accessible from the cabin of the vehicle such that a user may place the drone on top of the moonroof accessory panel while inside the cabin. The moonroof accessory panel may also be used for other purposes beyond holding drones as well.

10 Claims, 17 Drawing Sheets

(56) References Cited

OTHER PUBLICATIONS https://www.cir.net/rubber-is-the-material-of-choice-for-many-industries/#:~:text=Rubber's%20flexibility%20comes%20from%20the,resistant%20to%20breaking%20and%20cracking (Year: 2024).*

Tom Warren, "Land Rover has created a special discovery with a roof-mounted drone", The Verge, Transportation, cars, Geneva mortor show, Mar. 7, 2017, 1-3.

* cited by examiner

MOONROOF ACCESSORY PANEL

BACKGROUND

It may be advantageous to use an unmanned aerial vehicle (UAV) (which may be referred to as a "drone" herein) in association with a vehicle. In some instances, the drone may take-off from the vehicle, fly ahead of the vehicle, and capture data that may be relayed back to the vehicle. This data may then be used by the vehicle for various purposes, such as navigation decisions. For example, the drone may identify a traffic accident a mile ahead of the vehicle, relay this information back to the vehicle, and the vehicle may then re-route itself to avoid the accident. The drone may also be used to assist the vehicle in any other manner as well. However, in order for a drone to be implemented with a vehicle, the drone may need an area on and/or in the vehicle to land and/or take-off from to avoid the drone from having to be in the air at all times.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
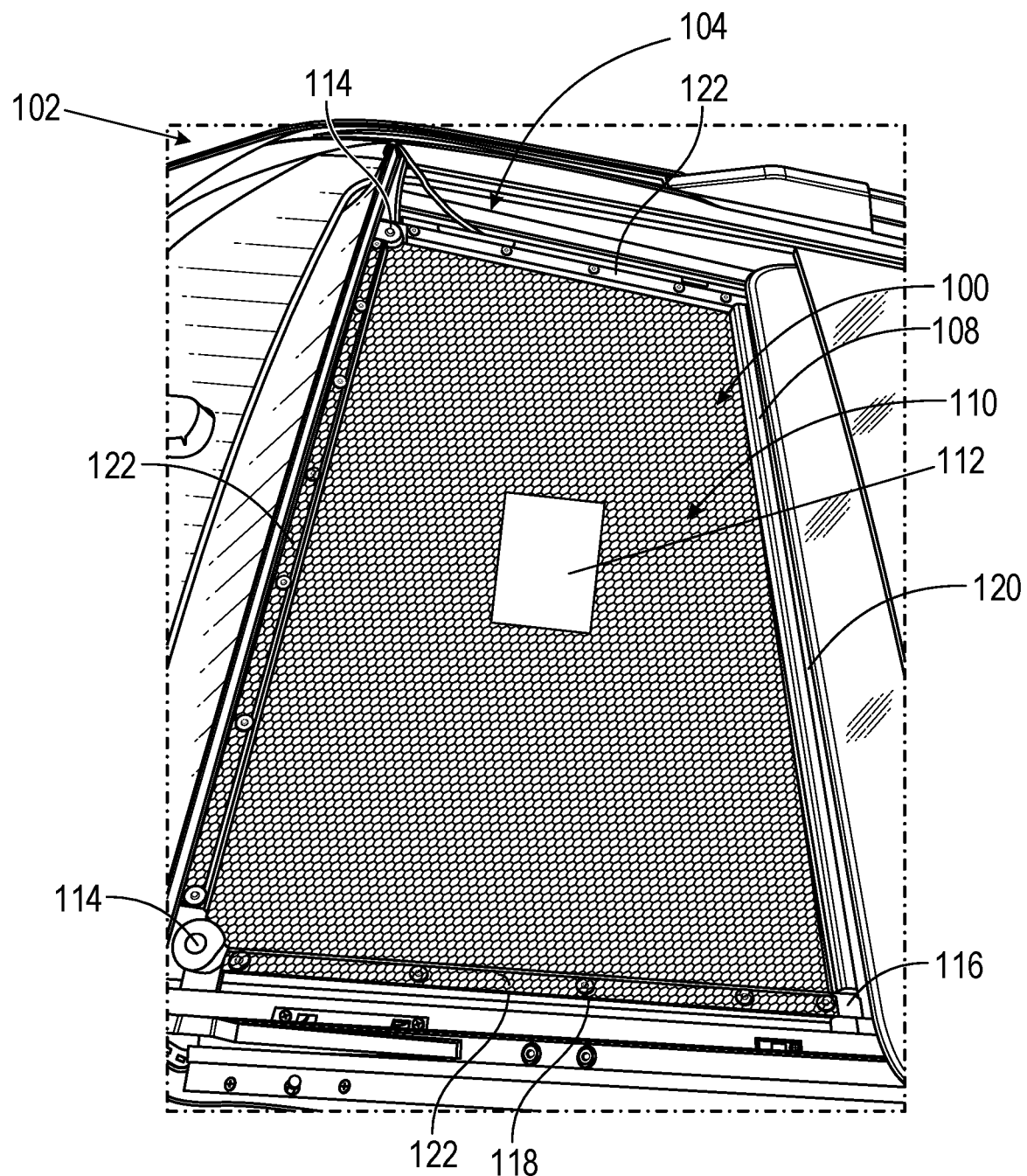
FIG. 1 illustrates an example moonroof accessory panel, in accordance with one or more embodiments of the disclosure.

This disclosure relates to, among other things, a moonroof accessory panel. Particularly, the moonroof accessory panel may be a removable panel that installs into the moonroof (reference may be made to a moonroof, but the moonroof accessory panel may similarly be implemented in a sunroof and/or any other type of roof) of a vehicle. The moonroof accessory panel may be used as a landing and/or take-off zone for a drone that may be associated with the vehicle. Such a landing/take-off zone may benefit from the following attributes: a flat or concave shape larger than the drone footprint, clear space above for takeoff and landing, a moveable top cover to protect the area and drone when not in use, access from inside the vehicle for drone loading and unloading, a barrier between the drone and vehicle passengers, secure retention to the vehicle, a low impact to vehicle aerodynamics, a low impact to typical (non-drone) vehicle usage, no or minimal permanent modifications to the base vehicle, and easy installation. While these features may be beneficial, they are not intended to limit the moonroof accessory panel described herein in any way. Additionally, while specific reference may be made to the moonroof accessory panel being used as a landing/take-off zone for a drone, the moonroof accessory panel may not necessarily be limited to this use case. For example, the moonroof accessory panel may serve as a storage location for the vehicle, a modular unit including switches, dials, etc. that can be used with the vehicle, a bug screen, a form of ventilation for the vehicle, and/or any other use case involving or not involving a drone.

The moonroof accessory panel may generally comprise an outer frame that may provide structural rigidity to the moonroof accessory panel and may integrate into existing moonroof structures, as well as a landing/take-off zone located centrally to the frame (and attached to the frame) that may be used to support the drone. While these general features may be included in some or all of the moonroof accessory panel configurations, the specific manner in which a given moonroof accessory panel is configured, however, may vary. As an example, a particular configuration may involve the use of a fabric material (or other flexible material) as the landing/take-off zone for the drone. That is, the central portion of the moonroof accessory panel that attaches to the frame of the moonroof accessory panel located at the outer edges of the moonroof may be made from a flexible material. The fabric panel may be advantageous due to lighter weight, and ability to fold for storage. That is, the frame may be configured to fold when the landing/take-off zone comprises the fabric material. A second example configuration may involve the use of a rigid panel instead of a flexible panel. The rigid panel configuration may use a rotating cam design that may serve as the primary install action, along with several passive features for retention.

In some embodiments, the configuration of the frame may also vary. For example, the frame may be a four-sided frame, a three-sided frame, and/or a two-sided frame. Additional configurations with any other number of sides may also be applicable. Examples of these different frame configurations may be depicted in FIGS. 6A-6D. The three-sided frame may include many of the same structural elements as the four-sided frame, but may eliminate the need for a fourth removable member of the frame. For example (as illustrated further herein) a four-sided frame may include three foldable members and one removable member. At installation, the three foldable members may be unfolded, and the fourth removable members may be attached to produce the four-sided frame. Thus, when the frame is removed and folded for storage, there may be two separate pieces to the frame. In this manner, the three-sided frame may provide for easier storage of the moonroof accessory panel, as the three foldable members may simply be folded together. A second example alternative configuration may involve a two-sided frame. In this configuration, the two members of the frame may be installed on opposite ends of the moonroof, and the landing/take-off zone may be stretched between the two members. This configuration may be beneficial in that the landing/take-off zone may be rolled back into one of the members when not in use (for example, similar to a scroll). In this manner, the moonroof accessory panel may not necessarily need to be removed from the vehicle moonroof when not in use. Instead, the two members may simply serve as additional permanent structure in the moonroof, and the landing/take-off zone may be stretched across the two members when it is desired to use the moonroof accessory panel for a drone.

Additionally, the different members that comprise the sides of the frame may be connected together using different types of corner connectors. In embodiments involving a landing/take-off zone comprising a flexible material, the corner connectors may include mechanisms that may allow the different members to fold into one another when the moonroof accessory panel is removed from the moonroof (for ease of storage). For example, as depicted in additional detail in FIGS. 2A-2B, the corner connectors may include a pivot joint that may allow a corner connector to rotate to allow two sides of the frame to fold together. Additional examples of such mechanisms may also be illustrated in FIG. 11 as well. The mechanisms may also include any other mechanism not illustrated in the examples provided in FIGS. 2A-2B and FIG. 11 as well.

Furthermore, the frame may include one or more different types of retention mechanisms that may be used to physically secure the frame to existing structure in the moonroof. That is, the outer frame of the moonroof accessory panel may be configured in such a way as to allow the frame to integrate into existing structure of the vehicle's moonroof for ease of installation/removal. Examples of these configurations may be described in additional detail below and also with respect to the figures. In some cases, these retention mechanisms of the frame may be hand operated, and thus may not require the use of tools or keys. However, the retention mechanisms of the frame may also be modified for higher retention strength or security as required by application.

In some embodiments, these retention mechanisms may be located on all sides of the frame so that the frame may be attached to the structure of the moonroof on all sides of the moonroof (however, the retention mechanisms do not necessarily need to be located on all sides). More specifically, in some embodiments, retention tabs may be located at various portions of the frame to integrate the frame into a wind deflector gutter and a sunshade track of the moonroof. For example, a first retention tab may include an elongated member that extends downward. When the moonroof accessory panel is installed in the moonroof of the vehicle, the retention tab slides over the wind deflector gutter such that the elongated member is then positioned on the outside of the wind deflector gutter. Similarly, the second retention tab may include a second elongated member that may extend downward. In this manner, the second elongated member may slide over the sunshade track such that the second elongated member is then positioned on the outside of the sunshade track. In some embodiments, these two tabs may be integrated into each corner connector included within the frame. Thus, a single corner connector may provide at least two retention points on two different sides of the moonroof. However, it should be noted that the retention mechanisms described above are merely exemplary, and any other types of retention mechanisms may similarly be used.

In some embodiments, the landing/take-off zone of the moonroof accessory panel may also include a landing indicator. The landing indicator may be a visual element located on the landing/take-off zone that may be used by the drone for localization purposes. That is, the drone may use the landing indicator to better identify the location of the landing/take-off zone so that the drone may perform a landing maneuver to land on the landing/take-off zone. For example, the landing indicator may be in the form of an AprilTag. However, this is merely exemplary, and the landing indicator may be any visual element that may be uniquely identified and/or tracked by the drone. The landing indicator may also include a non-visual element as well, such as a device that sends an auditory signal, for example.

The moonroof accessory panel may also be configured in such a way that the drone may rest on top of the moonroof accessory panel, and the moonroof glass may close above the drone such that the drone may be situated between the moonroof accessory panel and the moonroof glass. In some cases, the top of the moonroof accessory panel may also be accessible from the cabin of the vehicle, such that a drone may be provided to the top of the moonroof accessory panel from the cabin of the vehicle by a user. This may allow the user to load and unload the drone into the moonroof accessory panel without the vehicle cabin needing to be exposed to the environment (for example, to protect the vehicle cabin from weather conditions).

The moonroof accessory panel may provide such accessibility from the cabin in a number of different ways. A first example configuration (illustrated in FIG. 3) may involve the use of a latch affixed to the landing/take-off zone that may be removably attached to a frame of the moonroof accessory panel that is installed into the existing structure of the moonroof. In this configuration, the user may remove the latch, place the drone on top of the landing/take-off zone, and replace the latch once the drone has been placed on the landing/take-off zone. A second example configuration (illustrated in FIG. 9) may involve the use of one or more holes included in the landing/take-off zone. This configuration may be applicable if the landing/take-off zone comprises a flexible material. The one or more holes may be sized such that the material around the one or more holes may stretch to allow the user to push the drone through the landing/take-off zone from the cabin of the vehicle to the top of the landing/take-off zone. Once the drone is on top of the landing/take-off zone, the one or more holes may return to their initial size to prevent the drone from falling through the landing/take-off zone back into the vehicle cabin. A third example configuration (illustrated in FIG. 10), may involve a zipper or similar element that may be used to open and/or close the hole to allow a user to provide a drone to the top portion of the landing zone from the cabin of the vehicle.

Additional details about the various configurations of the moonroof accessory panel may be described below with respect to the figures.

Turning to the figures, FIG. 1 illustrates an example moonroof accessory panel 100, in accordance with one or more embodiments of the disclosure. As depicted in the figure, the moonroof accessory panel 100 may be integrated into a moonroof 104 of a vehicle 102. The moonroof accessory panel 100 may include at least a frame 108 and a landing/take-off zone 110 (which may also be referred to herein as a "central portion" for use cases in which the moonroof accessory panel 100 may not necessarily involve the use of a drone). In some cases, the landing/take-off zone 110 may also include a landing indicator 112.

In some embodiments, the landing/take-off zone 110 may be the area of the moonroof accessory panel 100 on which a drone (not depicted in the figure) may rest. That is, the landing/take-off zone 110 may serve as the portion of the moonroof accessory panel 100 from which the drone may take-off and/or land after navigating an environment external to the vehicle 102. In some embodiments, the landing/take-off zone 110 may comprise a flexible material, such as a fabric (as depicted in the figure). However, the landing/take-off zone 110 may also comprise a rigid material as well. The use of a flexible material for the landing/take-off zone 110 may be advantageous due to lighter weight, and ability to fold for storage. For example, as is illustrated further in FIGS. 5A-5D, if the landing/take-off zone 110 is made from a flexible material, the moonroof accessory panel 100 may be easily installed and/or removed from the moonroof 104 of the vehicle 102 by disengaging any retention features on the frame 108 and folding the different sides of the frame 108 together (also depicted in FIGS. 5A-5D). In configurations including a flexible landing/take-off zone 110, the landing/take-off zone 110 may be attached to the frame 108 at one or more attachment points 118. For example, the figure may depict one or more screws and washers as being used to attach the landing/take-off zone 110 to the frame 108. However, the landing/take-off zone 110 may also be attached to the frame in any other manner as well. For example, using an adhesive, using a zipper, using a channel impression in which the fabric is provided to a slot and trapped within the slot using a plastic material (or other type of material), etc.

In some embodiments, the frame 108 may provide structural rigidity to the moonroof accessory panel 100 and may integrate into existing moonroof 104 structures, as well as a landing/take-off zone 110 located centrally to the frame 108 (and attached to the frame) that may be used to support the drone. The configuration of the frame 108 may also vary. For example, the frame 108 may be a four-sided frame, a three-sided frame, and/or a two-sided frame. Additional configurations with any other number of sides may also be applicable. Examples of these different frame configurations may be depicted in FIGS. 6A-6D. The three-sided frame may include many of the same structural elements as the four-sided frame, but may eliminate the need for a fourth removable member 120 of the frame. For example (as illustrated further herein) a four-sided frame may include three foldable members 122 and one removable member. At installation, the three foldable members 122 may be unfolded, and the fourth removable member 120 may be attached to produce the four-sided frame. Thus, when the frame 108 is removed and folded for storage, there may be two separate pieces to the frame 108. In this manner, the three-sided frame may provide for easier storage of the moonroof accessory panel 100, as the three foldable members 122 may simply be folded together. A second example alternative configuration may involve a two-sided frame 108. In this configuration, the two members of the frame 108 may be installed on opposite ends of the moonroof 104, and the landing/take-off zone 110 may be stretched between the two members. This configuration may be beneficial in that the landing/take-off zone 110 may be rolled back into one of the members when not in use (for example, similar to a scroll). In this manner, the moonroof accessory panel 100 may not necessarily need to be removed from the vehicle moonroof 104 when not in use. Instead, the two members may simply serve as additional permanent structure in the moonroof 104, and the landing/take-off zone may be stretched across the two members when it is desired to use the moonroof accessory panel 100 for a drone.

Additionally, the different members that comprise the sides of the frame 108 may be connected together using different types of corner connectors (for example, first corner connectors 114 and/or second corner connectors 116). In embodiments involving a landing/take-off zone 110 comprising a flexible material, the first corner connectors 114 may include mechanisms that may allow the foldable members 122 to fold into one another when the moonroof accessory panel 100 is removed from the moonroof 104 (for ease of storage). For example, as depicted in additional detail in FIGS. 2A-2B, the first corner connectors 114 may include a pivot joint that may allow a corner connector 114 to rotate to allow two foldable members 122 of the frame 108 to fold together. Additional examples of such mechanisms may also be illustrated in FIG. 11 as well. The mechanisms may also include any other mechanism not illustrated in the examples provided in FIGS. 2A-2B and FIG. 11 as well. The second corner connectors 116 may include structure that may allow the removable member 120 to be attached to and/or removed from the remaining three foldable members 122 of the frame (illustrated in additional detail in FIG. 4A-4B).

Furthermore, the frame 108 may include one or more different types of retention mechanisms that may be used to physically secure the frame 108 to existing structure in the moonroof 104. That is, the outer frame 108 of the moonroof accessory panel 100 may be configured in such a way as to allow the frame 108 to integrate into existing structure of the vehicle's moonroof 104 for ease of installation/removal. Examples of these configurations may be described in additional detail below and also with respect to the figures. In some cases, these retention mechanisms of the frame 108 may be hand operated, and thus may not require the use of tools or keys. However, the retention mechanisms of the frame may also be modified for higher retention strength or security as required by application. In some embodiments, these retention mechanisms may be located on all sides of the frame 108 so that the frame may be attached to the structure of the moonroof 104 on all sides of the moonroof 104 (however, the retention mechanisms do not necessarily need to be located on all sides). More specifically, in some embodiments, retention tabs may be located at various portions of the frame to integrate the frame into a wind deflector gutter and a sunshade track of the moonroof 104.

In some embodiments, the landing indicator 112 may be a visual element located on the landing/take-off zone 110 that may be used by the drone for localization purposes. That is, the drone may use the landing indicator 112 to better identify the location of the landing/take-off zone 110 so that the drone may perform a landing maneuver to land on the landing/take-off zone 110.

In some embodiments, the landing indicator 112 may be in the form of an AprilTag. However, this is merely exemplary, and the landing indicator 112 may be any visual element that may be uniquely identified and/or tracked by the drone.

Figure 2A:
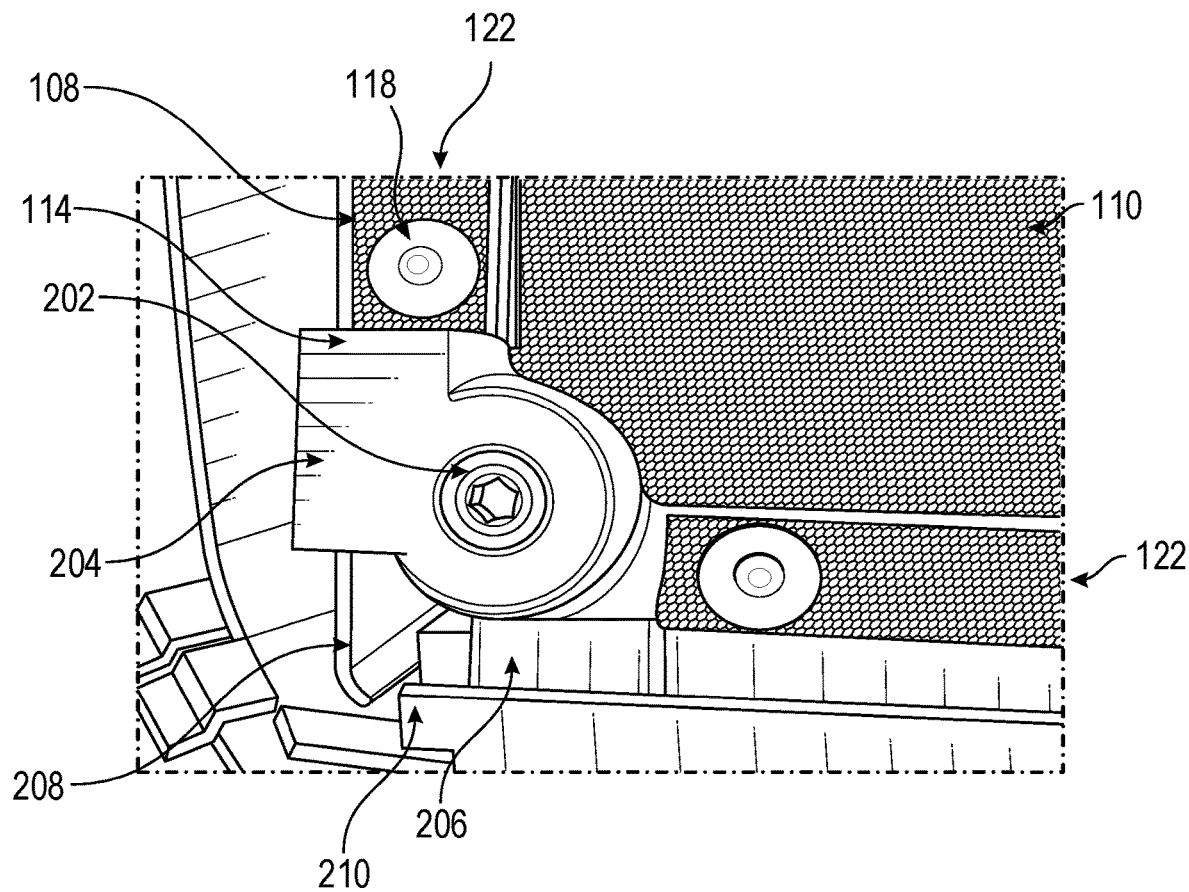
FIGS. 2A-2B illustrate an example frame corner connector, in accordance with one or more embodiments of the disclosure.
Figure 2B:
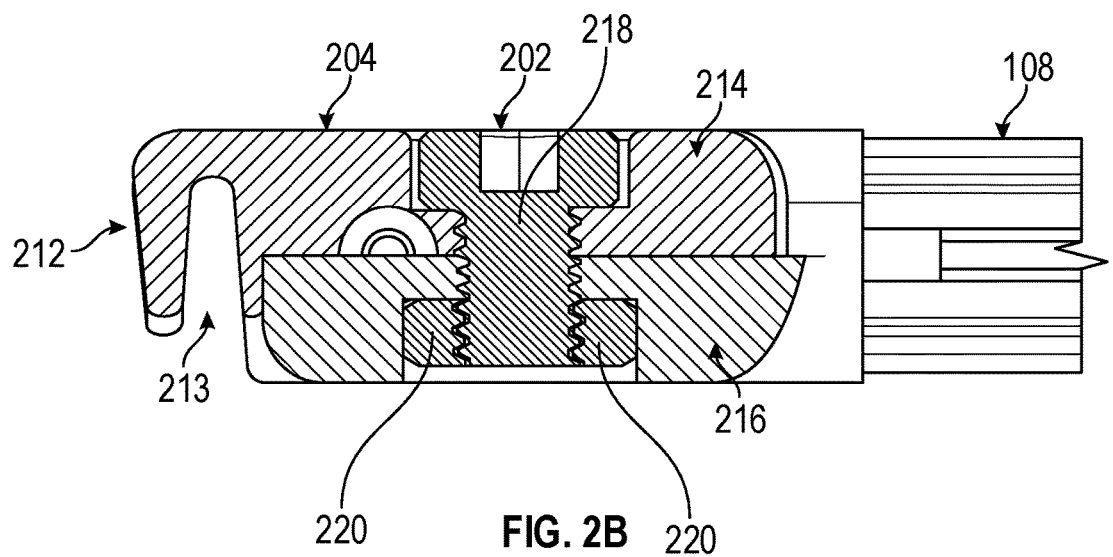

FIGS. 2A-2B illustrate an example frame corner connector 114, in accordance with one or more embodiments of the disclosure. That is, FIGS. 2A-2B may provide a close up view of the corner connector 114. The corner connector 114 may serve multiple purposes. A first purpose may include providing a mechanism by which the sides (for example, foldable members 122) of the frame 108 may be folded together for storage purposes. A second purpose of the corner connector 114 may include providing retention elements used to removably affix the moonroof accessory panel 100 into existing structural elements of the vehicle moonroof. In some embodiments, the corner connector 114 may include at least a pivot joint 202, a first retention tab 204, and/or a second retention tab 206.

The pivot joint 202 may be a mechanism by which a corner connector 114 to rotate to allow two foldable members 122 of the frame 108 to fold together. That is, the corner connector 114 may include a top portion 214 and a bottom portion 216 with the pivot joint 202 spanning the top portion 214 and a bottom portion 216. The pivot joint 202 may be configured in such a manner as to allow the top portion 214 to rotate with respect to the bottom portion 216. This rotation may result in a rotation of the corner connector 114, which consequentially may result in two foldable members 122 folding together. To accomplish this, the pivot joint 202 may comprise a first portion 218 and a second portion 220. The first portion 218 and second portion 220 may be two separate, threaded portions of the pivot joint 202 that may allow the first portion 218 to rotate relative to the second portion 220. However, this is just one non-limiting example of a pivot joint 202 configuration, and any other configuration that may allow for the rotation of the first portion 214 relative to the second portion 216 may be applicable as well.

The first retention tab 204 and the second retention tab 206 may be portions of the corner connector 114 that may be used to removably affix the moonroof accessory panel 100 into existing structural elements of the vehicle moonroof. Particularly, the vehicle moonroof may include a wind deflector gutter 208 and/or a sunshade track 210. The wind deflector gutter 208 may be an element within the moonroof that may reduce wind noise within the cabin of the vehicle. The wind deflector gutter 208 also catches moisture and includes a drain tube for such moisture. The sunshade track 210 may be a track that exists separately from the track on which the glass associated with the moonroof moves. FIG. 2B depicts a side view of the same corner connector 114 depicted in FIG. 2A. This side view illustrates that the retention tab 204 may include an elongated member 212 that extends downward. When the moonroof accessory panel is installed in the moonroof of the vehicle, the retention tab 204 slides over the wind deflector gutter 208 such that the elongated member 212 is then positioned on the outside of the wind deflector gutter 208 (the wind deflector gutter 208 would slide into the space 213 shown in the figure. Similarly (although not depicted in FIG. 2B), the retention tab 206 may include a second elongated member. In this manner, the second elongated member may integrate with the sunshade track 210. Thus, a single corner connector 114 may provide at least two retention points on two different sides of the moonroof.

Although FIG. 2A only depicts only particular corner connector 114, as shown in FIG. 1 (and other figures presented herein), the frame 108 of the moonroof accessory panel may similarly include any other number of corner connectors 114 as well.

It should be noted that these retention mechanisms may be specific to certain types of vehicles and any other retention mechanism may be employed depending on the structure of a given vehicle's moonroof. That is, the use of the retention tab 204 and the retention tab 206 are not intended to be limiting in any way, and are merely examples of mechanisms that may be used to removably affix the moonroof accessory panel to the moonroof of the vehicle.

Figure 3:
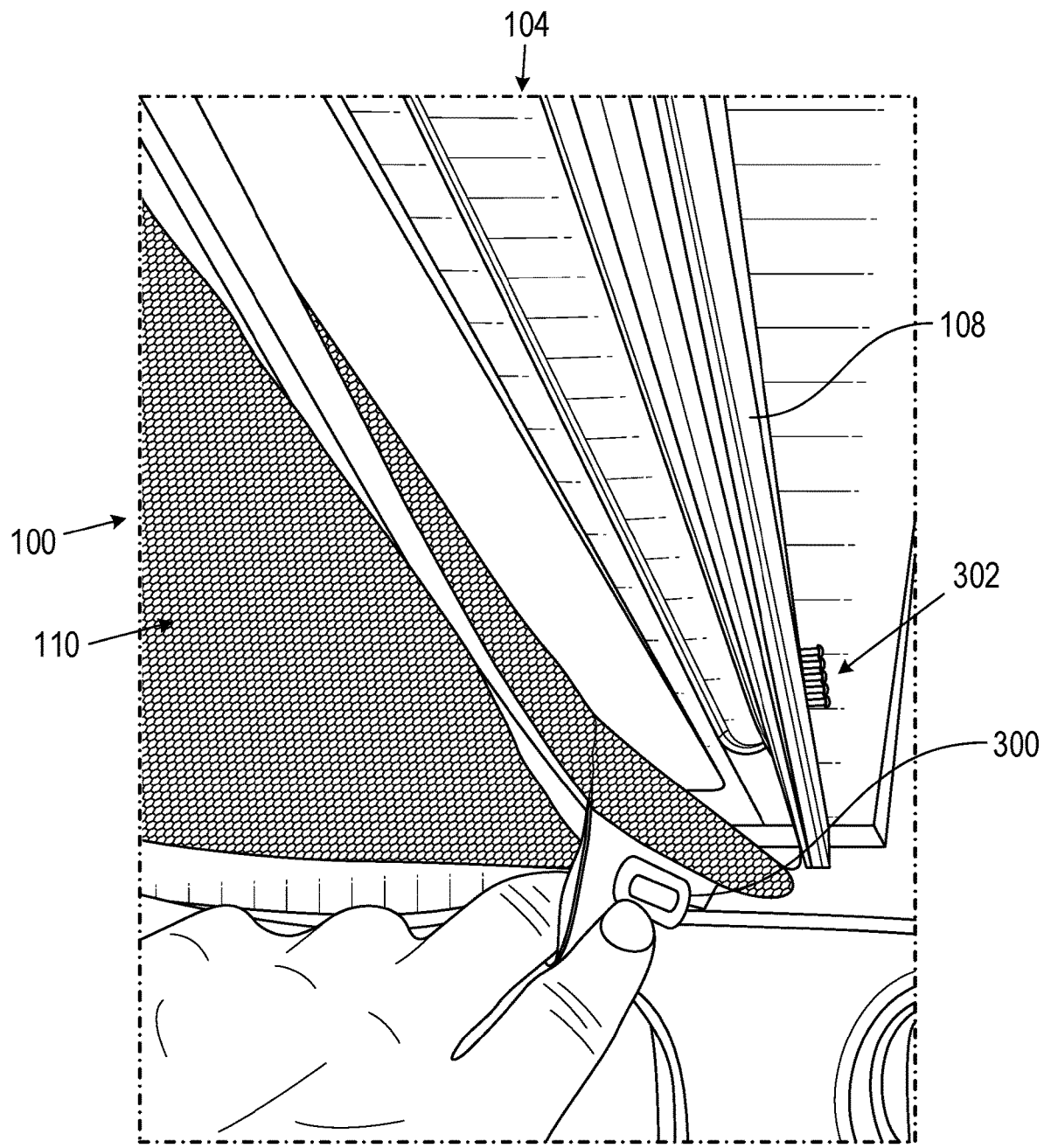
FIG. 3 illustrates an example moonroof accessory panel latch, in accordance with one or more embodiments of the disclosure.

FIG. 3 illustrates an example moonroof accessory panel latch 300, in accordance with one or more embodiments of the disclosure. In some embodiments, a moonroof accessory panel 100 may include such a latch 300 so as to allow a user within the cabin of the vehicle to access a top portion of the moonroof accessory panel 100. In this manner, a drone may be provided to the top of the moonroof accessory panel 100 from the cabin of the vehicle by a user.

To allow the user to access the top portion of the moonroof accessory panel 100, the latch 300 may be removably attached to one or more protruding elements 302. The one or more protruding elements 302 may protrude from the frame 108, and the latch 300 may be pulled over the one or more protruding elements 302. In this manner, the latch 300 may attach to the one or more protruding elements 302 and may retain the landing/take-off zone 110 against the frame 108. The one or more protruding elements 302 depicted in the figure may include one or more screws protruding from the frame 108. However, this is merely exemplary, and any other item may be used as a protruding element as well. When the user desires to access the top portion of the moonroof accessory panel, the user may remove the latch 300 from the one or more protruding elements 302 as shown in the figure. In some embodiments, the moonroof accessory panel 100 may only include one such latch 300 one side. However, in other embodiments, the moonroof accessory panel 100 may include multiple latches 300 and multiple protruding elements 302 on multiples sides of the frame 108.

Figure 4A:
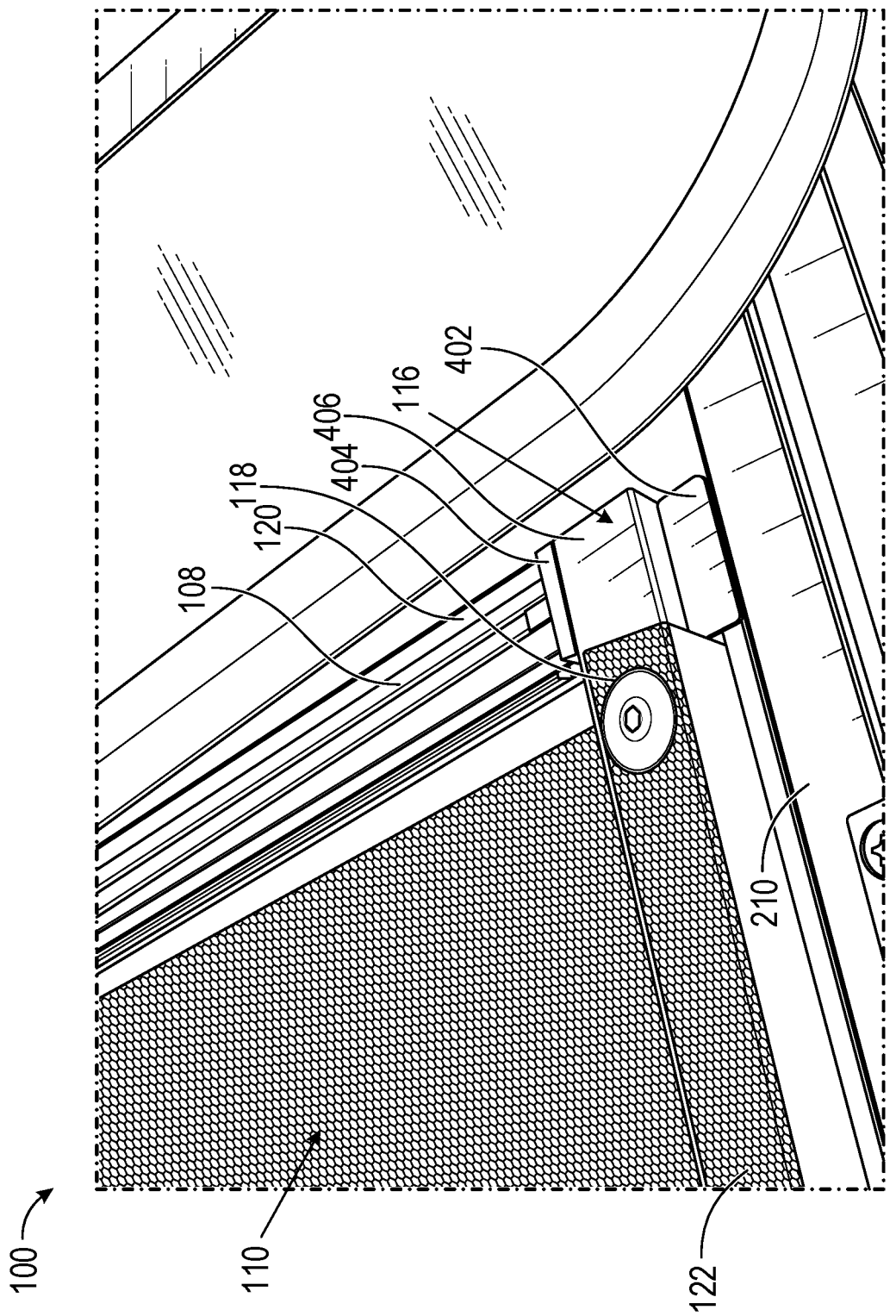
FIG. 4 illustrates an example rear bar, in accordance with one or more embodiments of the disclosure.
Figure 4B:
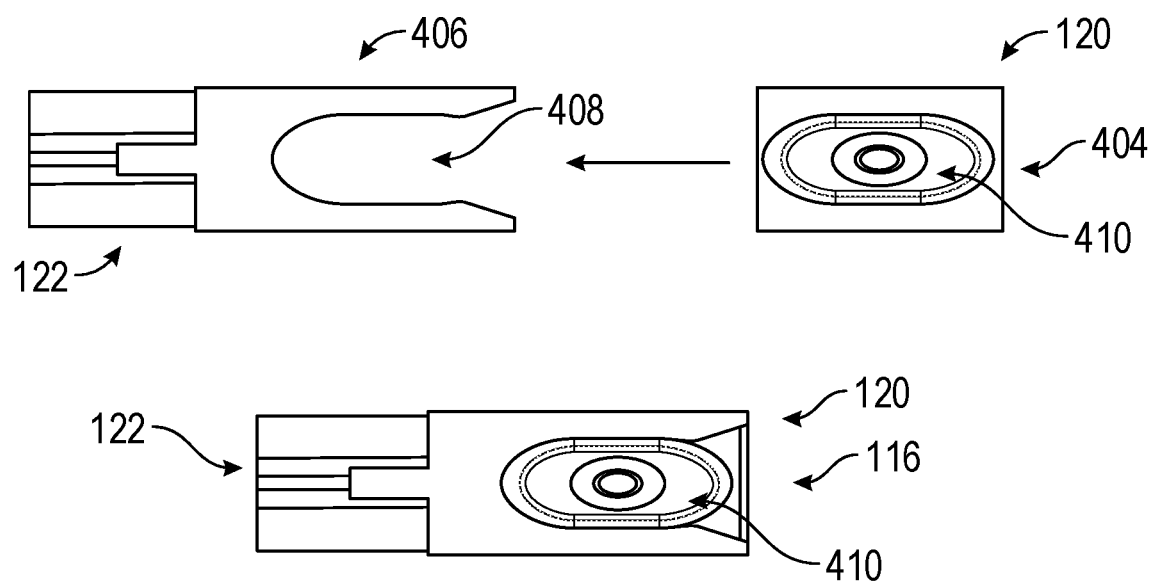

FIGS. 4A-4B illustrate an example rear corner connector 116, in accordance with one or more embodiments of the disclosure. As illustrated in FIG. 1, in some embodiments, the frame 108 of the moonroof accessory panel 100 may include three foldable members 122 and one removable member 120. In this manner, the removable member 120 may be removed from the frame 108 and the foldable members 122 may be folded together for more convenience storage. FIG. 4 may illustrate the rear corner connectors 116 that may be used to retain the removable member 120 within the frame 108 while the moonroof accessory panel 100 is in use in the moonroof of the vehicle. it should be noted that the use of the three foldable members 122 and the one removable member 120 is just one example configuration of the moonroof accessory panel 100, and other configurations may also be possible (with a few of these additional configurations being presented in subsequent figures).

In some embodiments (as illustrated in FIG. 4B), a rear corner connector 116 may comprise a first segment 406 and a second segment 404. The first segment 406 may be located on a foldable member 122 of the frame 108 and the second segment 404 may be located on the removable member 120 of the frame 108. However, in some embodiments, the second segment 404 may be located on a foldable member 122 of the frame 108 and the first segment 406 may be located on the removable member 120 of the frame 108 as well. Although not depicted in the figure, the removable member 120 may be associated with two rear corner connectors 116. The first segment 406 may include a cutout 408 into which a protruding element 410 located on the second segment 404 may be inserted. The protruding element 410 may be slid into the cutout 408 such that the first segment 406 and the second segment 404 may be removably locked together. Likewise, in order to remove the removable member 120 from the frame 108, the removable 120 member may simply be slid outwards from the cutout 408 of the foldable member 122. Additionally, in some cases, the protruding element 410 may be an oval shape to prevent the protruding element 410 from rotating within the cutout 408, which may result in the removable member 120 rotating with respect to the rest of the frame 108. However, the protruding element 410 may, in some cases, be circular in shape as well (as well as any other shape).

Additionally, the removable 120 member may be configured to be connected to the foldable members 122 in any other manner as well. For example, alternative snap-fit geometries may be employed, a spring-loaded mechanism may be used, pin holes may be included on the removable 120 member and the foldable members 122 such that a pin may be provided through the holes to maintain connection between the removable member 120 and the foldable members 122, etc.

Furthermore, the rear corner connector 116 may also include additional retention features that may allow for further points of retention against the moonroof for the moonroof accessory panel. Particularly, the first segment 406 may also include an additional retention tab 402 (shown in FIG. 4A) that may be used to removably affix the rear corner connector 116 to the sunshade track 210. This may provide additional structural support for the frame against the vehicle moonroof at the back end of the vehicle moonroof.

FIGS. 5A-5D illustrate an example moonroof accessory panel frame configuration, in accordance with one or more embodiments of the disclosure. Particularly, FIGS. 5A-5D may illustrate the manner by which a moonroof accessory panel may be constructed to be installed in a vehicle and/or broken down to be folded and stored. The particular moonroof accessory panel configuration depicted in these figures may involve the use of a frame with four side members. However, as depicted in other figures, a frame may include any other number of members as well, and this is simply only non-limiting example of an embodiment of such a frame.

Figure 5A:
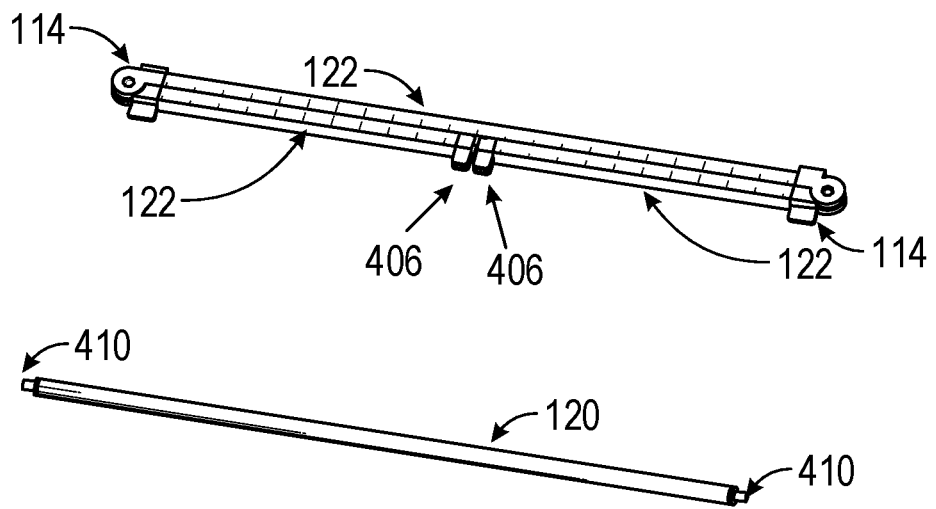
FIGS. 5A-5D illustrate an example moonroof accessory panel frame configuration, in accordance with one or more embodiments of the disclosure.
Figure 5B:
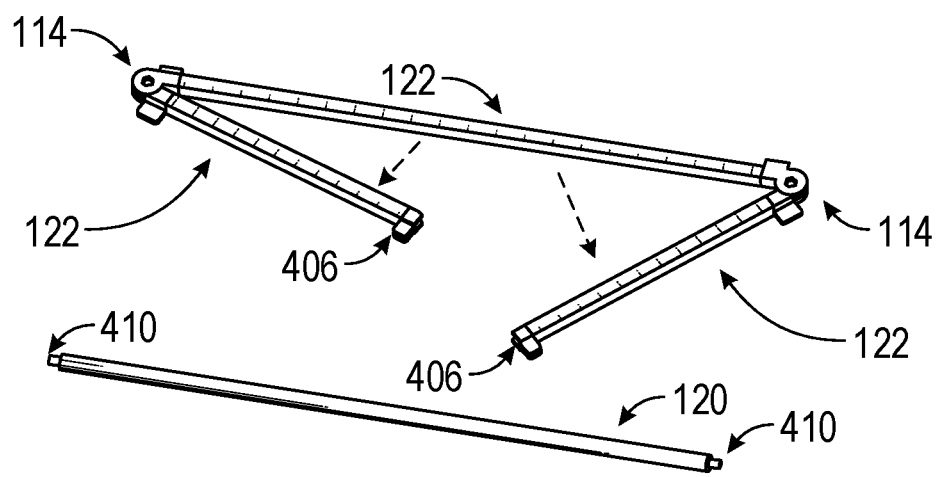
Figure 5C:
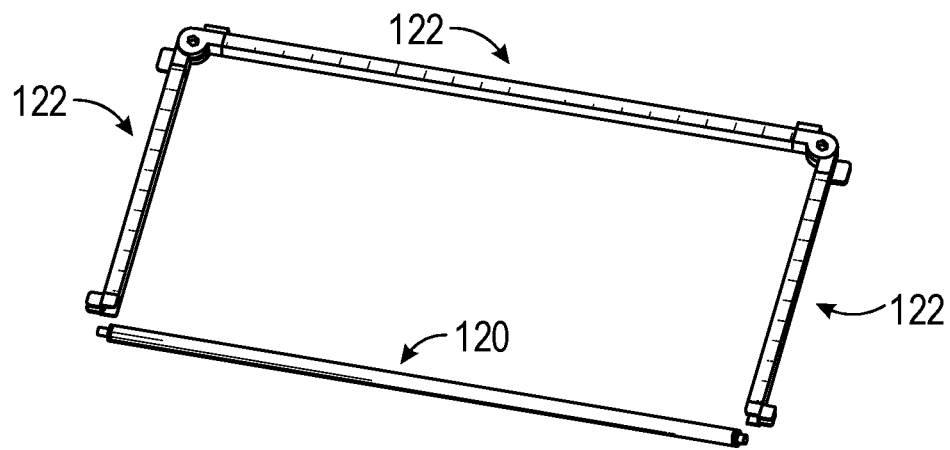
Figure 5D:
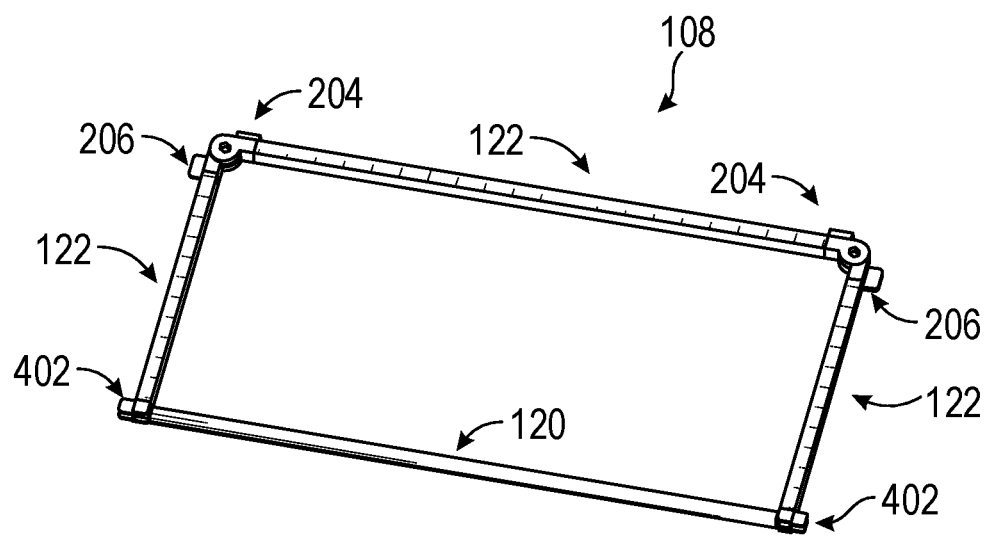

FIG. 5A may illustrate a first step of the installation process. In the first step, the foldable members 122 may be in a folded configuration (for example, for storage), and the removable member 120 may be separated from the foldable members 122. Continuing with FIG. 5B, the foldable members 122 may be unfolded such that three sides of the frame 108 may be moved to a spread configuration in which the foldable members 122 may be ready to accept the removable member 120 to create the overall frame 108. FIG. 5C may illustrate how the removable member 120 may then be inserted into the foldable members 122 in order to create the overall frame 108 structure. Finally, the protruding elements 410 of the removable member 120 may be inserted into the cutouts located in the first segments 406 of the foldable members 122. With this step being completed, the frame 108 may be completed as shown in FIG. 5D. The frame 108 may then be installed in the moonroof of the vehicle using the various retention tabs and other retaining mechanisms that may be used. Additionally, although not depicted in the figure, when the frame 108 is fully constructed, the flexible material may be fully stretched such that a drone may rest on the flexible material.

Figure 6A:
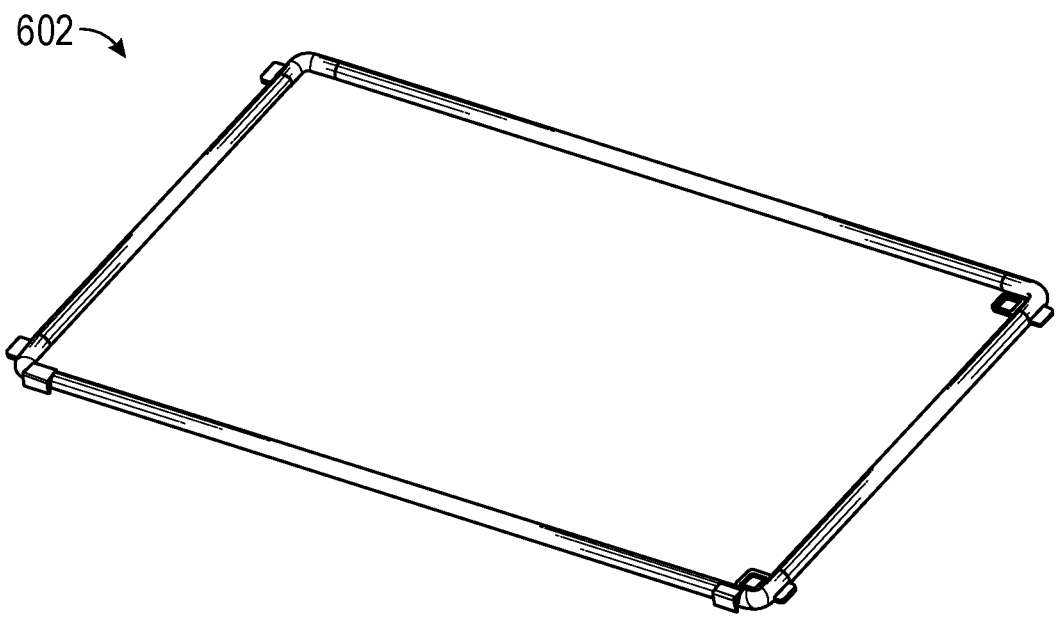
FIGS. 6A-6D illustrate additional example moonroof accessory panel frame configurations, in accordance with one or more embodiments of the disclosure.
Figure 6B:
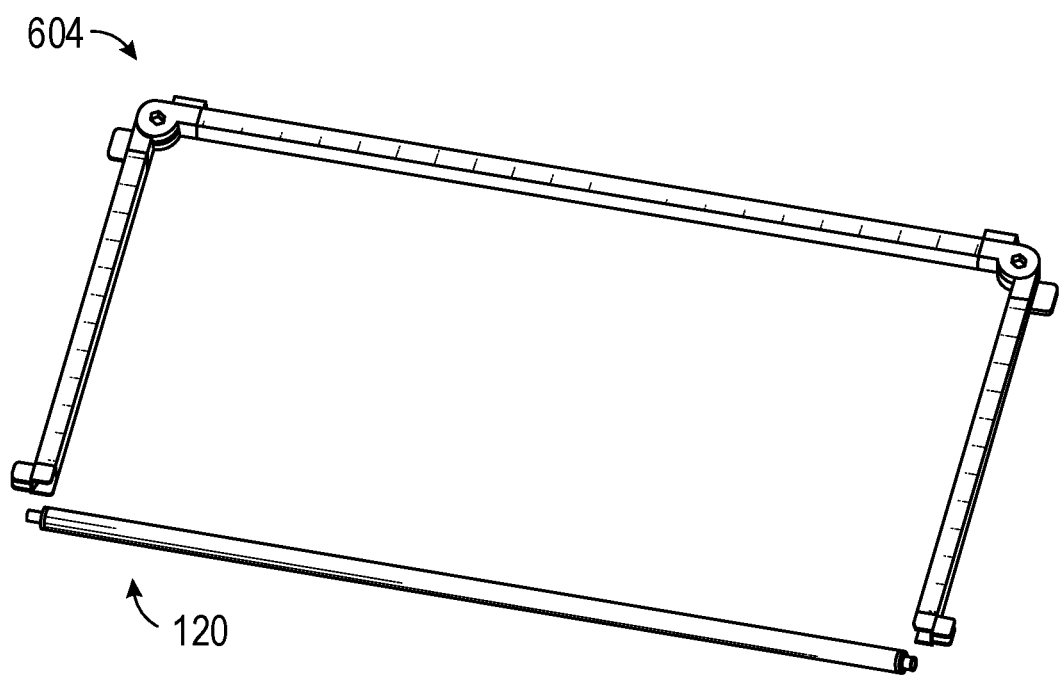

FIGS. 6A-6D illustrate additional example moonroof accessory panel frame configurations, in accordance with one or more embodiments of the disclosure. As aforementioned, one embodiment for the frame may include a frame with four members that connect together, with three of the members being permanently connected and foldable, and a fourth member being added to the other three members to construct the overall frame (as depicted in FIG. 6B). However, additional configurations may also be possible.

Figure 6C:
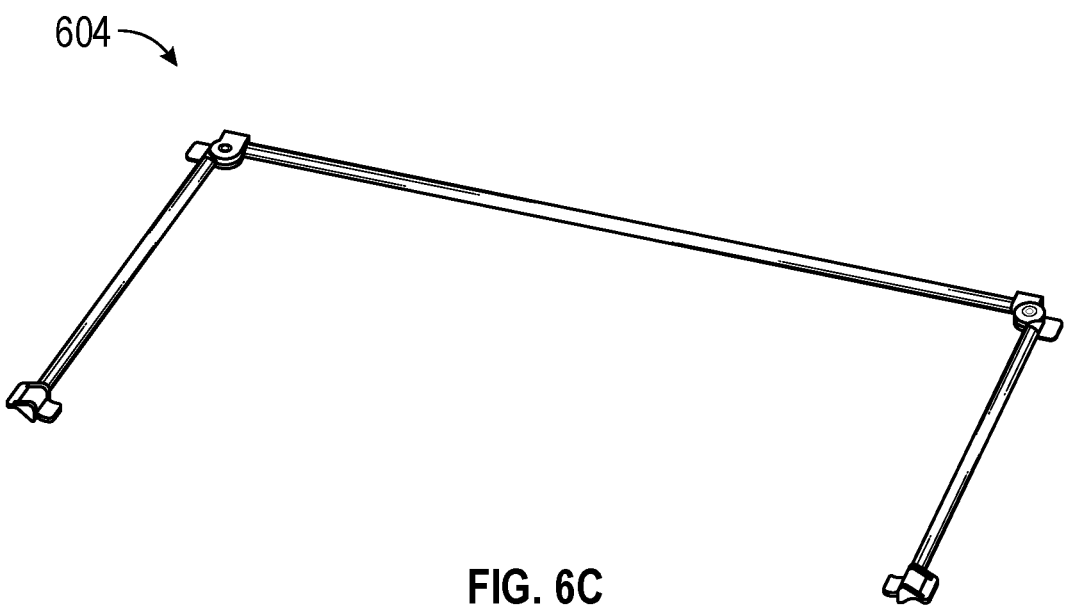
Figure 6D:
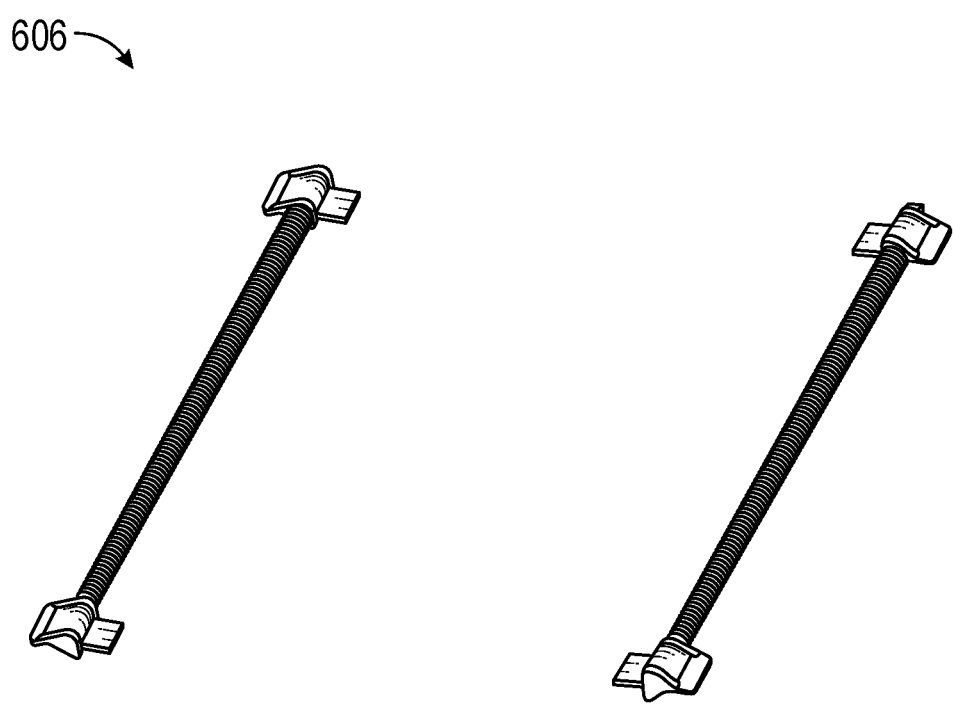
Figure 7A:
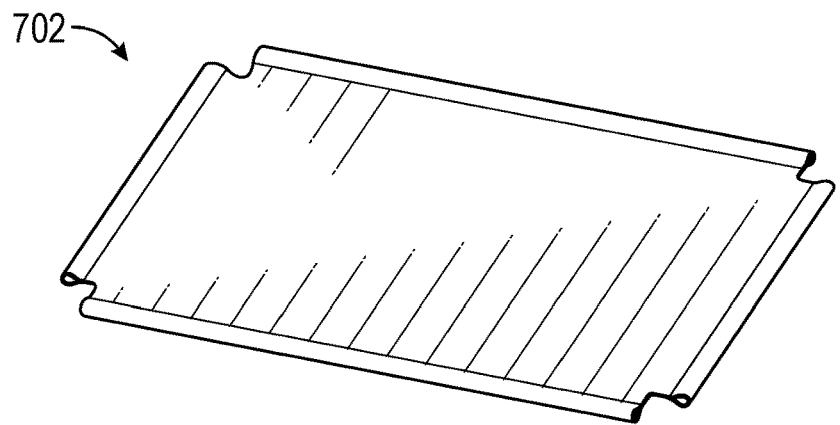
FIGS. 7A-7D illustrates example moonroof accessory panel landing zones, in accordance with one or more embodiments of the disclosure.
Figure 7B:
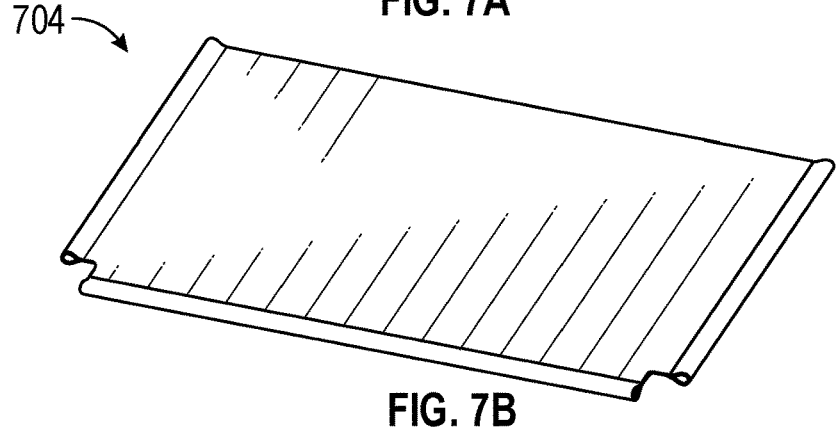
Figure 7C:
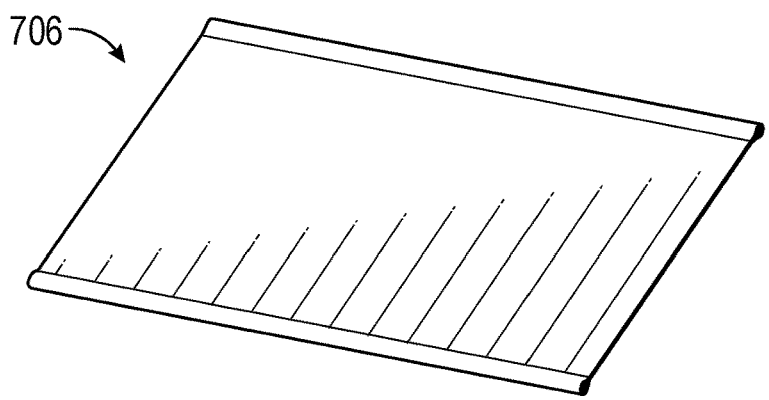
Figure 7D:
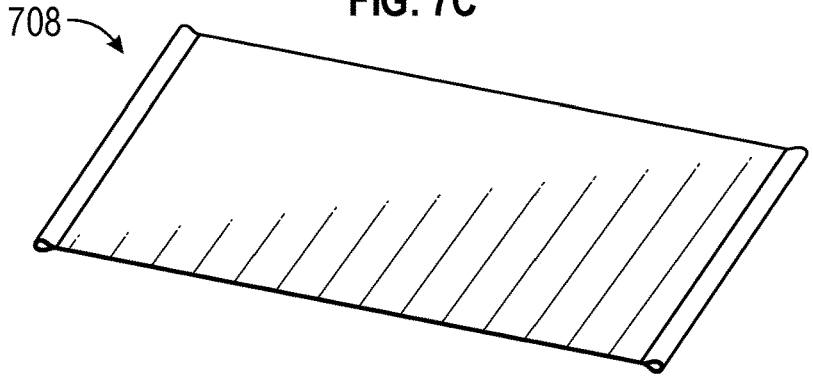

A first example (as depicted in FIG. 6A) may include a four-sided static frame 602. In this configuration, all four of the members included in the frame 602 may be permanently connected together instead of one of the members being removable as is the case in FIG. 6B (which may depict another four-sided frame 604 with a removable member 120. This may allow for an easier installation process into the moonroof, but may not allow the frame to be deconstructed and folded for storage purposes. This configuration may be illustrated in additional detail in FIG. 13. A second example (as depicted in FIG. 6C) may include a three-sided frame 604. The three-sided frame 604 may be similar to the four-sided folding frame 108 depicted in FIG. 6B. The three-sided frame 604 may differ from the four-sided folding frame 108, however, in that the removable member 120 may not be included, but the folding members 122 may still be included. A third example (as depicted in FIG. 6D) may include a two-sided frame 606. This configuration may be illustrated in additional detail in FIG. 15.

FIGS. 7A-7D illustrates example moonroof accessory panel landing zones, in accordance with one or more embodiments of the disclosure. Particularly, FIGS. 7A-7D may illustrate different different landing zones configured for use with the different types of moonroof accessory panel frame configurations illustrated in FIGS. 6A-6D. For example, the first landing zone 702 may be configured for use with the four-sided frame 602 or the four-sided frame 604, the second landing zone 704 may be configured for use with the three-sided frame 604, and the third landing zone 706 and the fourth landing zone 708 may be configured for use with the two-sided frame 606.

Figure 8:
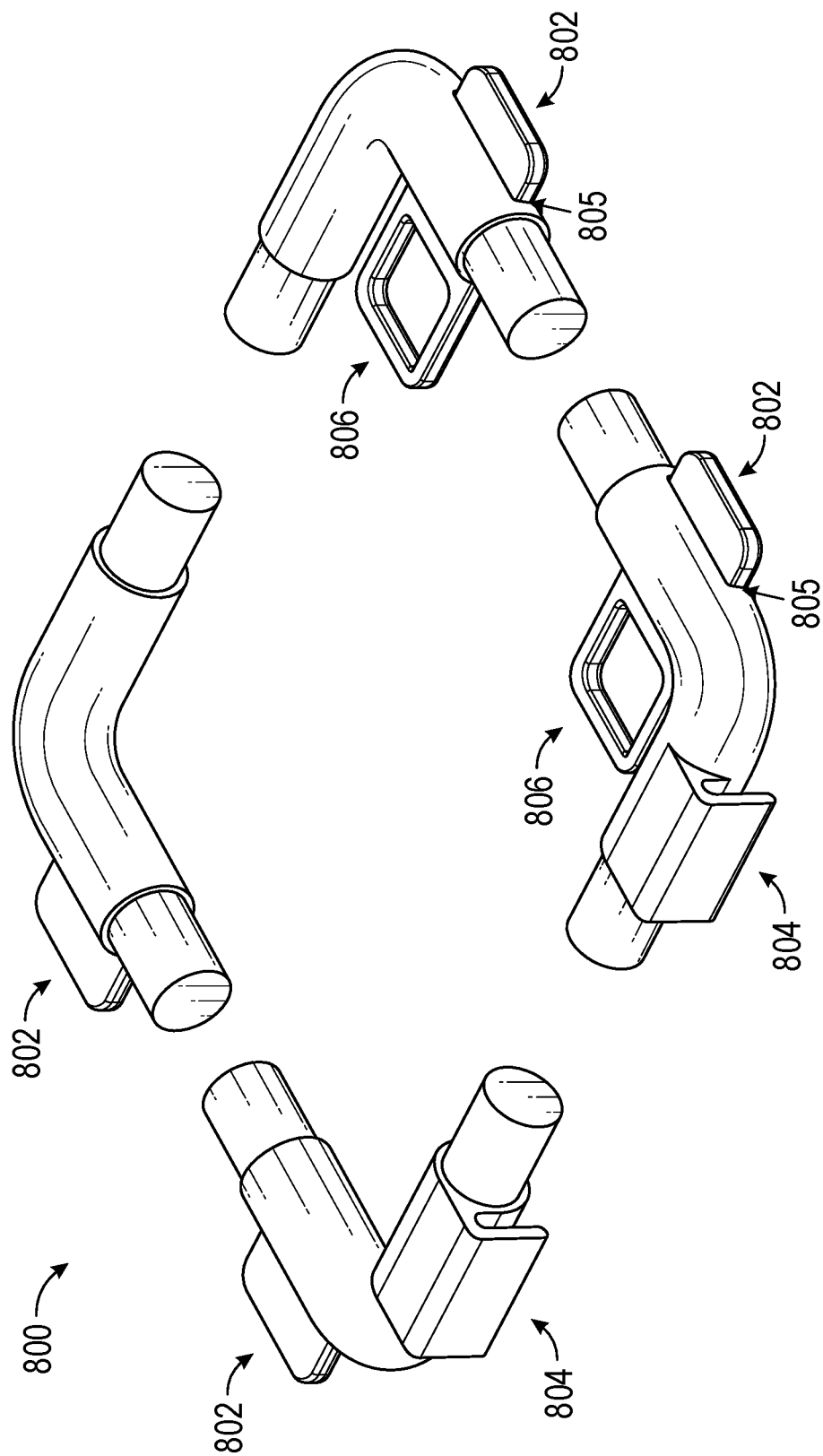
FIG. 8 illustrates additional example moonroof accessory panel corner connectors, in accordance with one or more embodiments of the disclosure.

FIG. 8 illustrates additional example moonroof accessory panel corner connectors 800, in accordance with one or more embodiments of the disclosure. Particularly, the corner connectors 800 depicted in FIG. 8 may be static connectors, such as the static connectors depicted in the four-sided static frame 602 illustrated in FIG. 6A. Instead of including a pivot point to allow the various members of the frame to fold together, the corner connectors 800 may not be adjustable, such that the frame associated with the corner connectors 800 is static. However, the corner connectors 800 may still include one or more retention tabs (for example, a first retention tab 802 and/or a second retention tab 804, as well as any other number of retention tabs) to allow for the moonroof accessory panel to be removably locked into the moonroof of the vehicle.

In some cases, the first retention tab 802 may be configured such that a moonroof accessory panel may be inserted into a moonroof opening of a vehicle, and, subsequent to the insertion, any first retention tabs 802 may be adjusted by a user to more effectively lock the moonroof accessory panel into the moonroof of the vehicle. For example, the first retention tabs 802 may be positioned within an opening 805 on the corner connectors 800. The first retention tabs 802 may also include a loop 806 located on an interior portion of the corner connectors 800. In this manner, when the moonroof accessory panel is inserted into the moonroof, a user may still have access to the loops 806 located on the interior portion of the corner connectors 800. The user may be able to push the loops 806 forward such that the first retention tabs 802 may be pushed further through the openings 805. This may, in turn, push the first retention tabs into the structure associated with the vehicle moonroof to serve as a locking mechanism to maintain the moonroof accessory panel in the moonroof of the vehicle.

Figure 9:
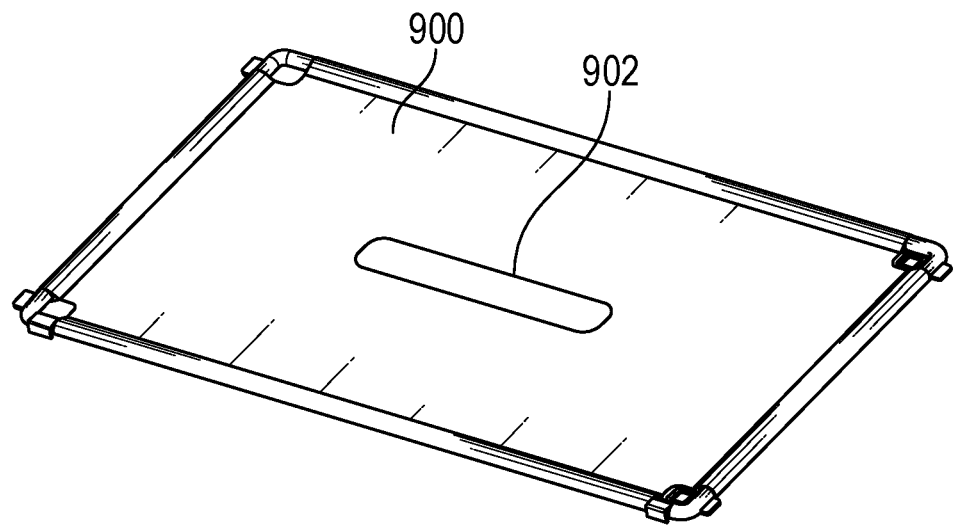
FIG. 9 illustrates an additional example moonroof accessory panel landing zone, in accordance with one or more embodiments of the disclosure.

FIG. 9 illustrates an additional example moonroof accessory panel landing zone 900, in accordance with one or more embodiments of the disclosure. The landing zone 900 depicted in the figure includes a hole through which a drone may be pushed up to a top portion of the landing zone 900. That is, the landing zone 900 depicted in the figure may be made from a flexible material such that the material may stretch to allow the drone to be pushed up and onto the landing zone 900, but the hole 902 may then return to an original size to prevent the drone from falling back through the hole 902 into the cabin of the vehicle. Although only one hole 902 is depicted in the figure, any other number of holes may be used, and any hole may be located at any portion of the landing zone 900 as well. Additionally, although the figure depicts the static corner connectors illustrated in FIG. 8, this same land zone 900 with a hole 902 may be implemented in any other moonroof accessory panel configuration as well.

Figure 10:
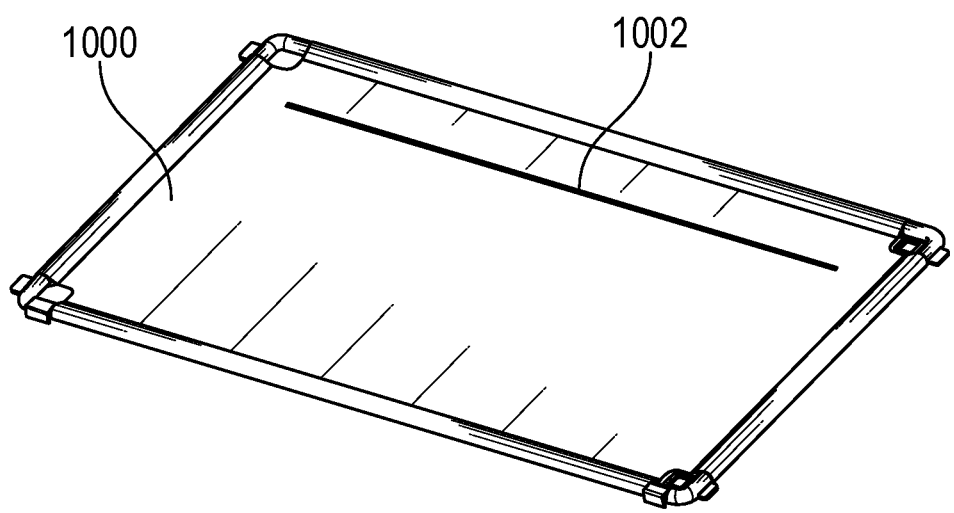
FIG. 10 illustrates an additional example moonroof accessory panel landing zone, in accordance with one or more embodiments of the disclosure.

FIG. 10 illustrates an additional example moonroof accessory panel landing zone 1000, in accordance with one or more embodiments of the disclosure. The landing zone 1000 depicted in the figure also includes a hole 1002 through which a drone may be pushed up to a top portion of the landing zone 1000. However, the landing zone 1000 may differ from the landing zone 900 in that the hole 1002 may include a zipper or similar element that may be used to open and/or close the hole to allow a user to provide a drone to the top portion of the landing zone 1000 from the cabin of the vehicle. Although only one hole 1002 is depicted in the figure, any other number of holes may be used, and any hole may be located at any portion of the landing zone 1000 as well. Additionally, although the figure depicts the static corner connectors illustrated in FIG. 8, this same land zone 1000 with a hole 1002 may be implemented in any other moonroof accessory panel configuration as well.

FIGS. 11A-11E illustrate additional example moonroof accessory panel corner connectors, in accordance with one or more embodiments of the disclosure.

Figure 11A:
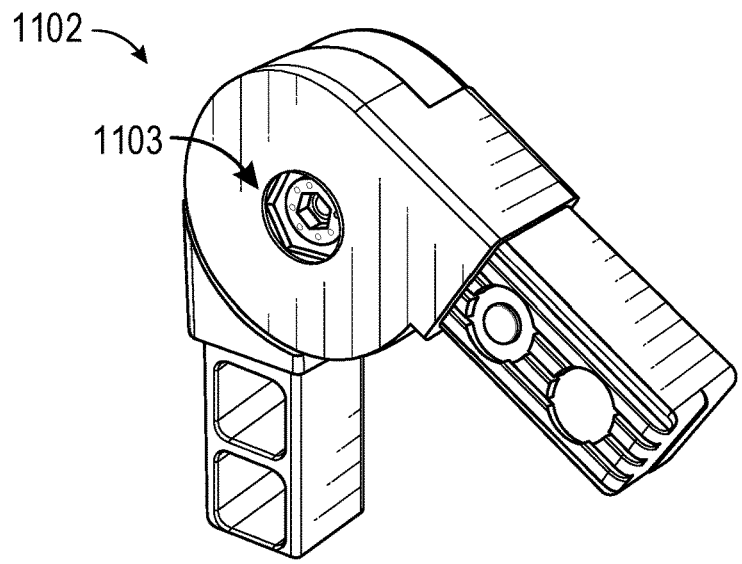
FIGS. 11A-11E illustrate additional example moonroof accessory panel corner connectors, in accordance with one or more embodiments of the disclosure.

FIG. 11A illustrates a first example alternative corner connector 1102. The alternative corner connector 1102 may be similar to the corner connector 114 depicted in FIG. 2B. The corner connector 1102 may differ from the corner connector 114 in that the corner connector 1102 may include a bolt 1103 that acts as a pivot hinge.

Figure 11B:
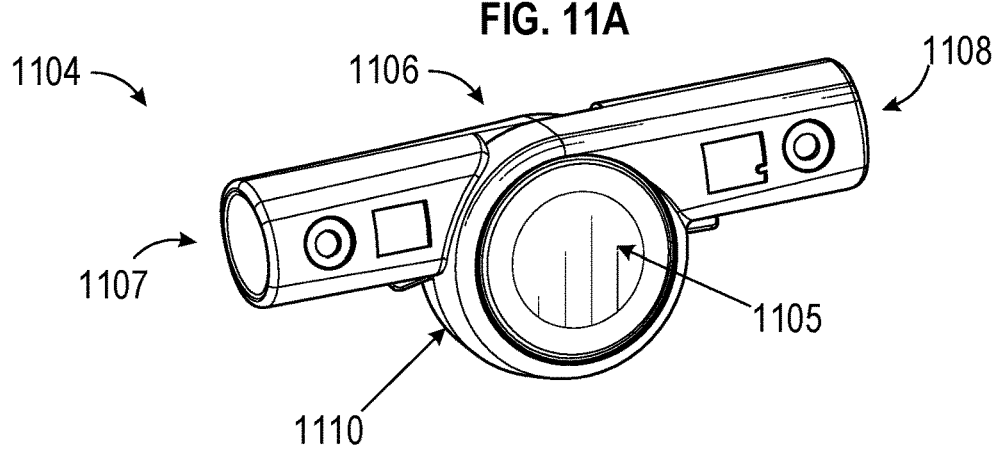
Figure 11C:
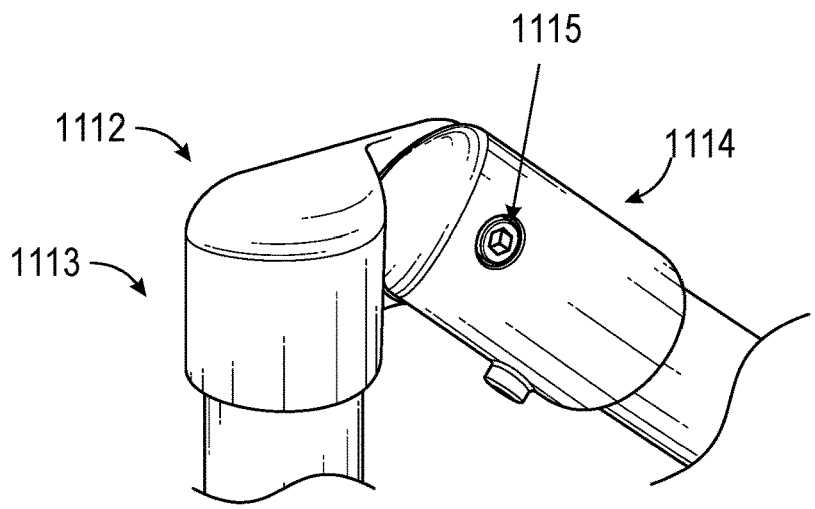
Figure 11D:
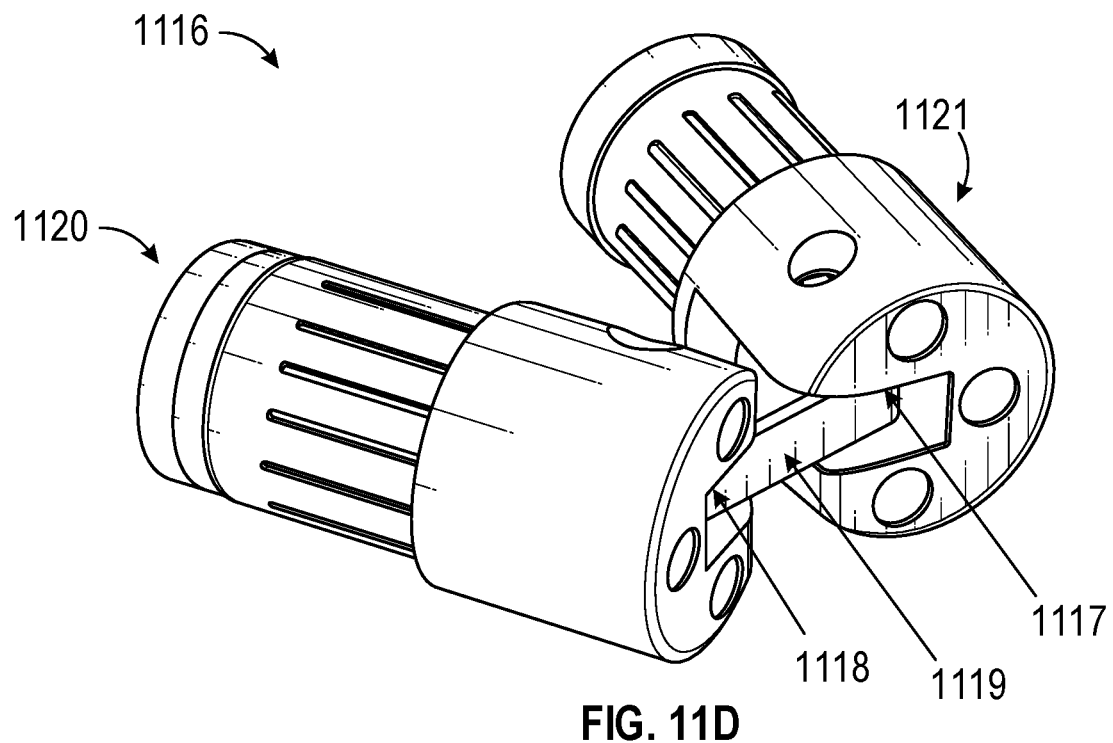
Figure 11E:
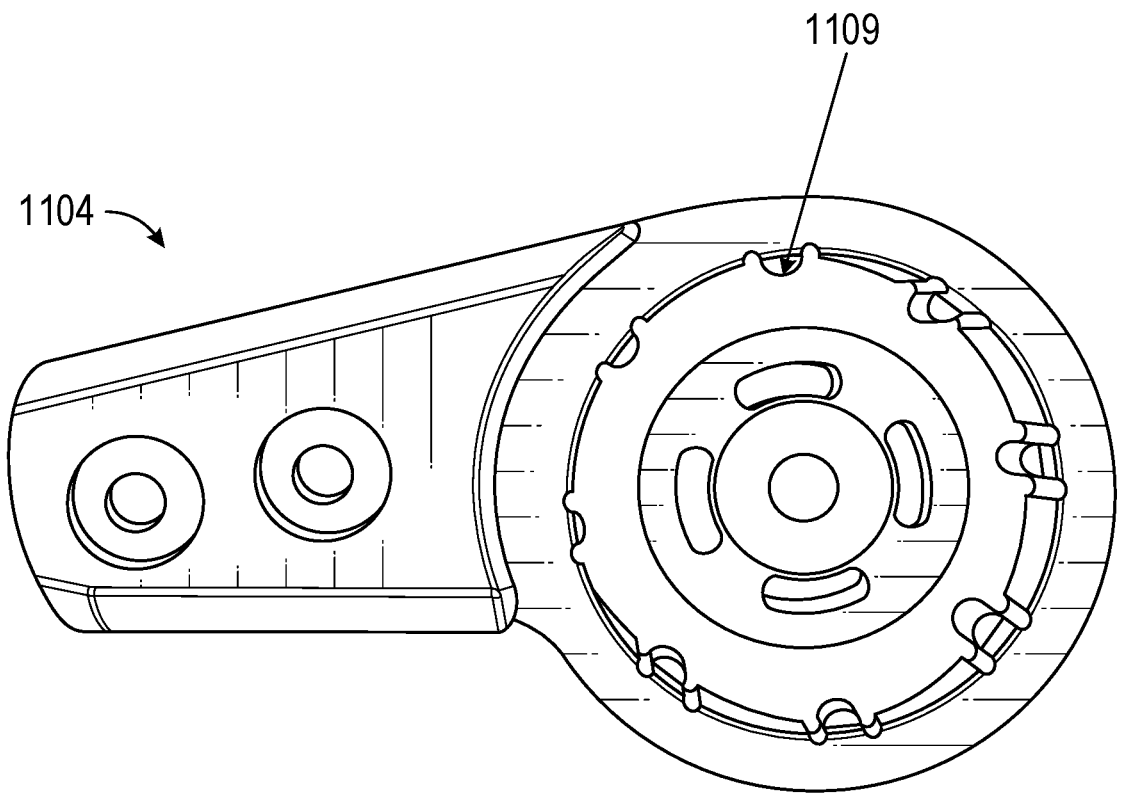

FIGS. 11B and 11E illustrate a second example alternative corner connector 1104. The corner connector 1104 may include a button. The button may be pressed by a user to unlock a joint 1106, such that the two members (member 1107 and member 1008) may be rotated with respect to one another. As illustrated in FIG. 11E, the corner connector 1104 may also include one or more slots 1109 within a central 1110 area associated with the button 1105. The members may physically engage with the one or more slots 1109 such that when the user releases the button 1105, a member may be locked into one of several different positions depending on which slot 1109 the member is currently located within. In this manner, the members may be moved to, and locked within, pre-established angles at particular physical intervals.

FIG. 11C illustrates a third example alternative corner connector 1112. The corner connector 1112 may be similar to the corner connector 1102 and the corner connector 114, but may be associated with a lower profile. The two members (for example, member 1113 and member 1114) may be parallel to one another when folded. Additionally, the pivot point 1115 may be offset instead of being located in a center portion connected by the two members.

FIG. 11D illustrates a fourth example alternative corner connector 1116. The corner connector 116 may differ in that, rather than including a single point that may serve as a pivot point, two pivot points (for example, pivot point 1117 and pivot point 1118 may be used). That is, the two members (for example, member 1120 and member 1121) may connect to a central element 1119 at the pivot point 1117 and pivot point 1118. The member 1120 may rotate using the pivot point 1117, and the member 1121 may rotate using the pivot point 1118.

Figure 12A:
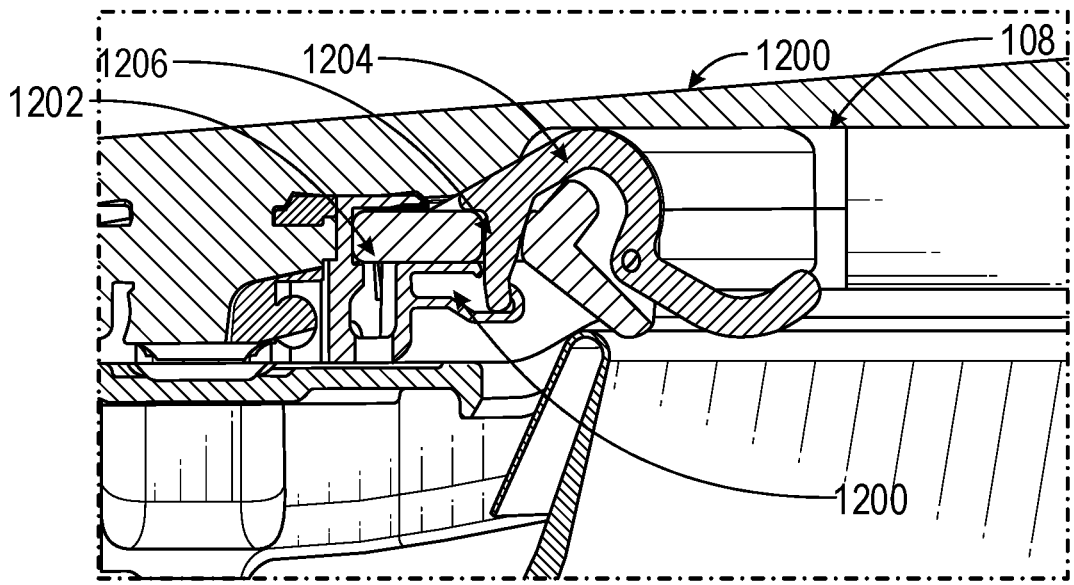
FIGS. 12A-12B illustrate an additional example moonroof accessory panel latch, in accordance with one or more embodiments of the disclosure.
Figure 12B:
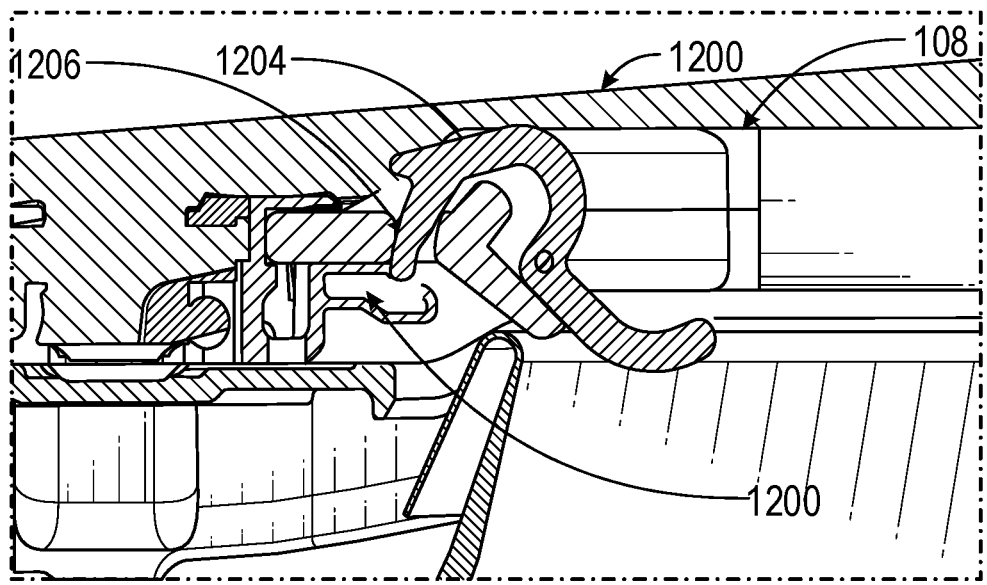

FIGS. 12A-12B illustrate an additional example moonroof accessory panel retention mechanism 1200, in accordance with one or more embodiments of the disclosure. The retention mechanism 1200 may be similar to other retention mechanisms described herein (for example, any of the corner connectors described herein), but may include additional components that may take advantage of additional moonroof geometry to provide additional security for the moonroof accessory panel with respect to the moonroof. For example, the retention mechanism 1200 may include a tab 1202 that may be received by the sunshade track 210. In addition to this tab, however, the retention mechanism 1200 may include a lever 1204 including an elongated member 1206 that may be removably inserted into an additional structural element 1208 of the vehicle moonroof. The lever 1204 may be configured to move upwards and downwards, such that the elongated member may enter and exit the additional structural element 1208. To accomplish this, the lever may include a second member 1210 that may be pushed down by a user. The action of pushing down the second member 1210 may cause the elongated member 1206 to lift from the additional structural element 1208 of the moonroof. Although not depicted in the figure, the second elongated member 1210 may also include a spring that may cause the lever 1204 to return to an initial position with the elongated member 1206 located within the additional structural element 1208 when force is not applied to the second elongated member 1210. In some cases, the lever 1204 may be inserted into the sunshade track 210.

Figure 13:
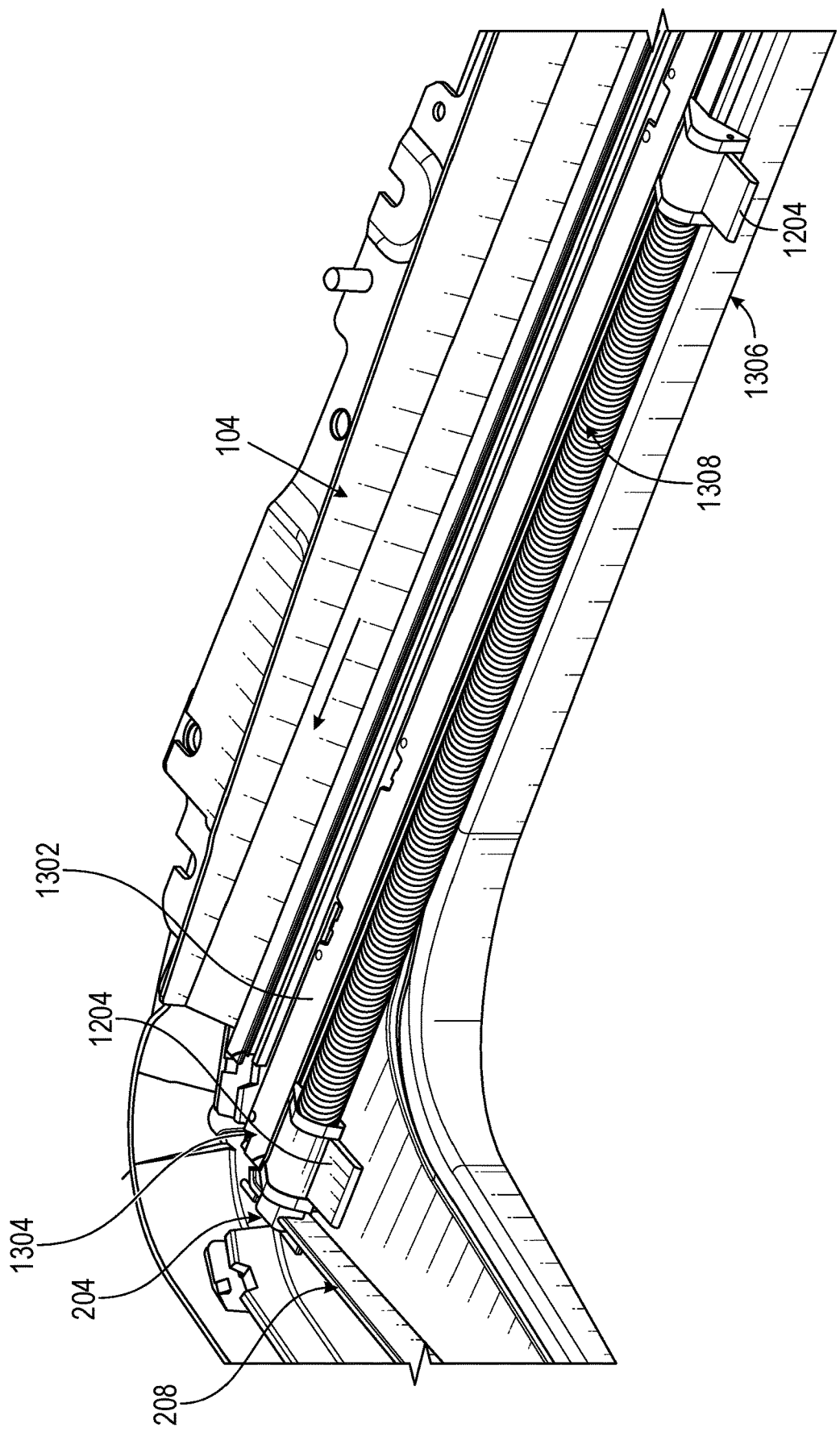
FIG. 13 illustrates an additional example moonroof accessory panel frame configuration, in accordance with one or more embodiments of the disclosure.

FIG. 13 illustrates an additional example moonroof accessory panel frame configuration, in accordance with one or more embodiments of the disclosure. Particularly, the configuration illustrated in the figure may be a more detailed view of the two-sided frame 606 illustrated in FIG. 6D. The figure may depict a close-up view of one member 1302 of the overall two-sided frame and how the member 1302 may interface with the structure of the moonroof 104. Although the figure only depicts on such member 1302, a second member may be positioned across the opening in the moonroof on a second side of the moonroof 104. Additionally, although the member 1302 may be illustrated as being positioned on a side of the moonroof, the two members of the two-sided frame may also be positioned on the front and back portions of the moonroof 104.

The member 1302 may not require corner connectors, such as those that are present in the embodiments involving three or four-sided frames, however, the member 1302 still may include a first retention mechanism 1404 and a second retention mechanism 1306 for removably affixing the member 1302 to the structure of the moonroof 104. For example, the first retention mechanism 1304 may include a first retention tab 204, which may engage with the wind deflector gutter 208 of the moonroof 104. The first retention mechanism 1304 may also include a lever 1204 that may serve as a second point of engagement between the first retention mechanism 1306 and the structure of the moonroof 104. The second retention mechanism 1306 may similarly include such a lever 1204 that may serve as an additional engagement point between the second end of the member 1302 and the moonroof 104.

Further, the landing zone 1308 of the two-sided frame may be implemented in a number of different ways. As illustrated in the figure, the landing zone 1308 may be made from a flexible material that may be retained around one of the members until it is desired to use the moonroof accessory panel for a drone. At that time, the landing zone 1308 may be unrolled and attached to the second member across the moonroof opening. However, as aforementioned, the landing zone 1408 may also be comprised of a rigid material. In such cases, the landing zone 1308 may always be extended and attached to both members of the two-sided frame.

Figure 14:
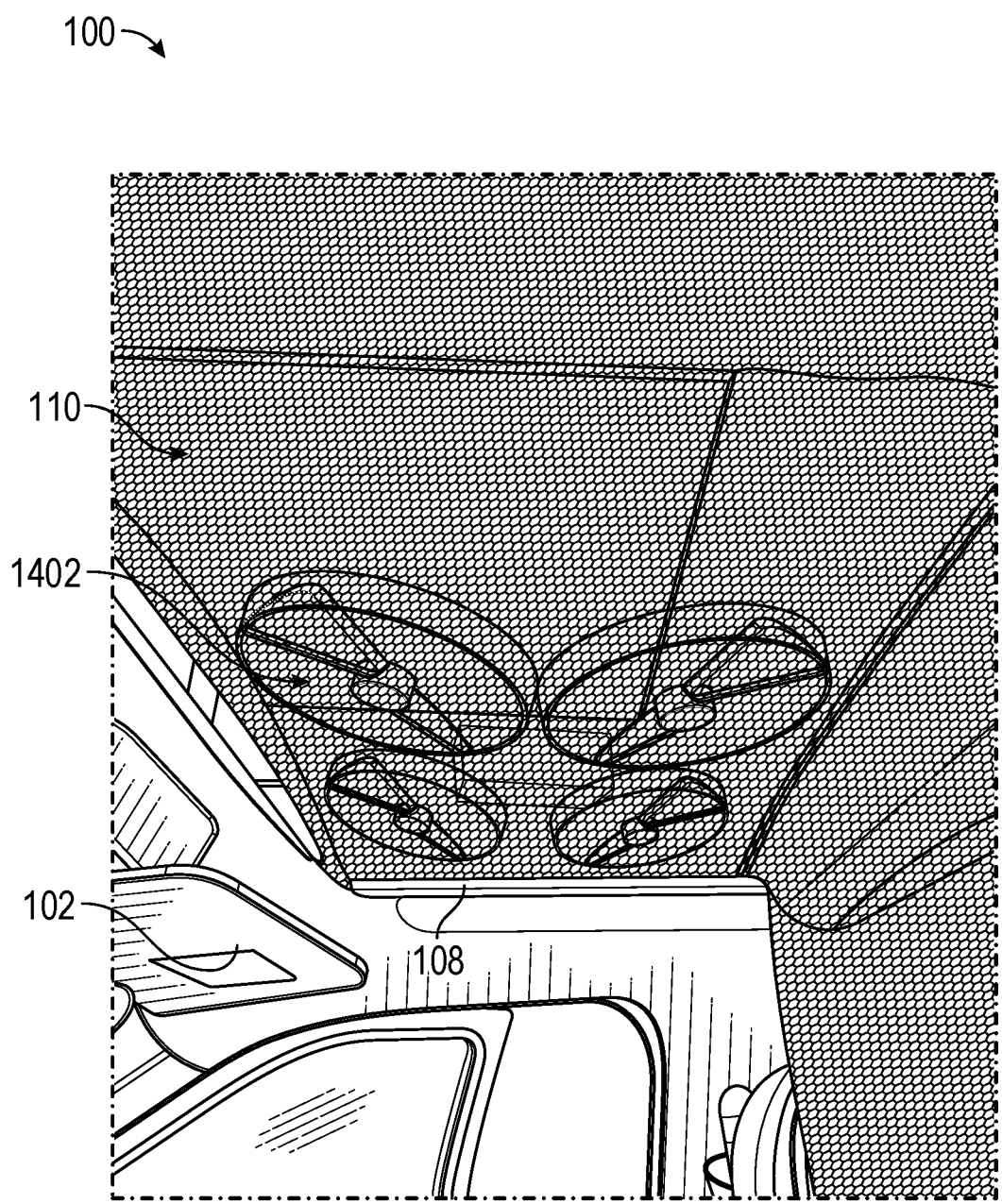
FIG. 14 illustrates an additional example moonroof accessory panel frame configuration, in accordance with one or more embodiments of the disclosure.

FIG. 14 illustrates an additional example moonroof accessory panel 100, in accordance with one or more embodiments of the disclosure. Particularly, the figure may illustrate a moonroof accessory panel 100 including a drone 1402 situated on top of a landing/take-off zone 110.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A moonroof accessory panel comprising:
a four-sided frame; and
a central portion removably or permanently attached to the four-sided frame, wherein the four-sided frame is configured to be removably integrated into a moonroof of a vehicle,
wherein the four-sided frame includes three foldable members and one removable member, and
wherein the four-sided frame includes at least two corner connectors configured to connect the three foldable members, wherein the two corner connectors include a pivot joint, and wherein the corner connectors include a first retention tab configured to removably affix the four-sided frame to a first structural element of the moonroof.

2. The moonroof accessory panel of claim 1, wherein the central portion is configured to receive a drone associated with a vehicle.

3. The moonroof accessory panel of claim 1, wherein the corner connectors include a second retention tab configured to removably affix the four-sided frame to a second structural element of the moonroof.

4. The moonroof accessory panel of claim 1, wherein the removable member includes a first protruding element on a first end and a second protruding element on a second end, wherein a first foldable member of the three foldable members includes a first cutout configured to receive the first protruding element, and wherein a second foldable member of the three foldable members includes a second cutout configured to receive the second protruding element.

5. The moonroof accessory panel of claim 1, wherein the central portion comprises a flexible material or a rigid material.

6. A moonroof accessory panel comprising:
a four-sided frame; and
a central portion removably or permanently attached to the four-sided frame, wherein the four-sided frame is configured to be removably integrated into a moonroof of a vehicle,
wherein the four-sided frame includes three foldable members and one removable member, and
wherein the removable member includes a first protruding element on a first end and a second protruding element on a second end, wherein a first foldable member of the three foldable members includes a first cutout configured to receive the first protruding element, and wherein a second foldable member of the three foldable members includes a second cutout configured to receive the second protruding element.

7. The moonroof accessory panel of claim 6, wherein the central portion is configured to receive a drone associated with a vehicle.

8. The moonroof accessory panel of claim 6, wherein the four-sided frame includes at least two corner connectors configured to connect the three foldable members, wherein the two corner connectors include a pivot joint, and wherein the corner connectors include a first retention tab configured to removably affix the four-sided frame to a first structural element of the moonroof.

9. The moonroof accessory panel of claim 8, wherein the corner connectors include a second retention tab configured to removably affix the four-sided frame to a second structural element of the moonroof.

10. The moonroof accessory panel of claim 6, wherein the central portion comprises a flexible material or a rigid material.

* * * * *